(12) United States Patent  
Ahmed et al.

(10) Patent No.: US 10,380,253 B2  
(45) Date of Patent: Aug. 13, 2019

(54) NATURAL LANGUAGE PROCESSING WITH DYNAMIC PIPELINES

(71) Applicant: International Business Machines Corporation, Armonk, NY (US)

(72) Inventors: Mohamed N. Ahmed, Leesburg, VA (US); Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 14/196,002

(22) Filed: Mar. 4, 2014

(65) Prior Publication Data

US 2015/0254232 A1  Sep. 10, 2015

(51) Int. Cl.
*G06F 17/28* (2006.01)
*G06F 17/27* (2006.01)
*G06F 16/36* (2019.01)

(52) U.S. Cl.
CPC ........ *G06F 17/2785* (2013.01); *G06F 16/367* (2019.01)

(58) Field of Classification Search
CPC ...................................... G06F 17/28
USPC .......................................... 704/9
See application file for complete search history.

(56) References Cited

U.S. PATENT DOCUMENTS

| 5,386,556 | A  | * | 1/1995  | Hedin ................... G06F 17/271 |
| 6,424,969 | B1 | * | 7/2002  | Gruenwald ....... G06F 17/30569 707/802 |
| 6,542,896 | B1 | * | 4/2003  | Gruenwald ............. G06F 16/30 |
| 8,280,903 | B2 | * | 10/2012 | Broder ................ G06F 17/2785 707/769 |

(Continued)

FOREIGN PATENT DOCUMENTS

| EP | 2045735 A2 | 4/2009 |
| WO | 2002031690 A3 | 10/2003 |

OTHER PUBLICATIONS

Dittenbach, Michael. Mining Semantics from Text: A Connectionist Approach to Ontology Enhancement for a Tourism Information System. Diss. 2003.*

(Continued)

*Primary Examiner* — Edwin S Leland, III
(74) *Attorney, Agent, or Firm* — David M. Quinn; Brian M. Restauro

(57) ABSTRACT

Natural language processing is provided. A computer processor, selects a pipeline based on an artifact that includes unstructured data, the pipeline identifying a first algorithm of a first set of algorithms of a first human language technology (HLT) component and a second algorithm of a second set of algorithms of a second HLT component; applies the first algorithm based on the artifact to generate a first cluster space associated with the artifact; amends an evidence chain associated with the artifact in response to applying the first algorithm, wherein the evidence chain (Continued)

includes one or more probabilistic findings of truth corresponding to the artifact; standardizes a first ontology of the first cluster space; applies the second algorithm based on the artifact to generate a second cluster space that is associated with the artifact; and identifies a set of information of one or more corpora that is relevant to the artifact.

20 Claims, 5 Drawing Sheets

(56) References Cited

U.S. PATENT DOCUMENTS

| | | | | |
|---|---|---|---|---|
| 8,359,191 | B2* | 1/2013 | Chen | G06F 16/367 704/9 |
| 8,443,005 | B1* | 5/2013 | Goldman | G06Q 50/01 707/798 |
| 2005/0044487 | A1* | 2/2005 | Bellegarda | G06F 16/30 715/229 |
| 2007/0162540 | A1* | 7/2007 | Lee | H04L 29/06 709/202 |
| 2009/0064008 | A1* | 3/2009 | Liu | G06F 16/54 715/764 |
| 2009/0204609 | A1* | 8/2009 | Labrou | G06F 17/3064 |
| 2009/0240650 | A1* | 9/2009 | Wang | G06F 16/685 706/54 |
| 2009/0254971 | A1* | 10/2009 | Herz | G06Q 10/10 726/1 |
| 2010/0030552 | A1* | 2/2010 | Chen | G06F 16/367 704/9 |
| 2012/0078595 | A1* | 3/2012 | Balandin | G06F 16/367 703/6 |
| 2013/0066648 | A1* | 3/2013 | Lipscher | G06Q 50/22 705/2 |
| 2013/0073490 | A1* | 3/2013 | Baughman | G06N 3/126 706/13 |
| 2013/0185112 | A1* | 7/2013 | Friedlander | G06Q 10/0631 705/7.22 |
| 2014/0279837 | A1* | 9/2014 | Guo | G06F 16/282 707/603 |
| 2014/0297268 | A1* | 10/2014 | Govrin | G06Q 40/02 704/9 |
| 2014/0369596 | A1* | 12/2014 | Siskind | G06K 9/00751 382/158 |
| 2015/0019912 | A1* | 1/2015 | Darling | G06F 11/2257 714/26 |
| 2015/0127567 | A1* | 5/2015 | Menon | G06Q 10/1053 705/321 |
| 2015/0254232 | A1* | 9/2015 | Ahmed | G06F 16/367 704/9 |
| 2015/0332157 | A1* | 11/2015 | Baughman | G06F 16/00 706/52 |

OTHER PUBLICATIONS

Curé, Olivier, and Robert Jeansoulin. "An fca-based solution for ontology mediation." Proceedings of the 2nd international workshop on Ontologies and information systems for the semantic web. ACM, 2008.*

Barbancon et al., "SPHINX: Schema integration by example" J Intell Inf Syst (2007) 29:145-184, DOI 10.1007/s10844-006-0011-2, Received: Dec. 3, 2003 / Revised: Jul. 7, 2005 / Accepted: Nov. 1, 2005, Published online: Feb. 2, 2007, Copyright Springer Science 30 Business Media, LLC 2007.

Curé et al., "An FCA-based Solution for Ontology Mediation", ONISW'08, Oct. 30, 2008, Napa Valley, California, USA, Copyright 2008 ACM 978-1-60558-255-9/08/10, pp. 39-46.

Gayral et al., "Une ontologie du temps pour le langage naturel", Actes de COLING-92, Nantes, Aug. 23-28, 1992, Proc. of COLING-92, Nantes, Aug. 23-28, 1992, pp. 295-302.

Jia-Li et al., "Towards natural language processing: A well-formed substring table approach to understanding garden path sentence", 978-1-4244-6977-2/10, © 2010 IEEE, 2010 2nd International Workshop on Database Technology and Applications (DBTA), Digital Object Identifier: 10.1109/DBTA.2010.5659102, provided in main idea dated Sep. 28, 2013.

Martins et al., "Supervision Language Control of Electromechanical Drives", Industrial Electronics, 2003. ISIE '03. 2003 IEEE International Symposium on vol. 2, 0-7803-7912-8/03, © 2003 IEEE, pp. 662-666.

Muresan, "Learning Constraint-based Grammars from Representative Examples: Theory and Applications", Columbia University, 2006, pp. 1-347, Copyright 2006, Samaranda Muresan.

Papadakis et al., "MI-MERCURY: A mobile agent architecture for ubiquitous retrieval and delivery of multimedia information", Published in: Journal Multimedia Tools and Applications, vol. 38 Issue 1, May 2008, pp. 147-184, doi>10.1007/s11042-007-0153-4.

Pease, "SUMO: A Sharable Knowledge Resource With Linguistic Inter-Operability", Published in: Natural Language Processing and Knowledge Engineering, 2003, Proceedings, 2003 International Conference on Oct. 26-29, 2003, 0-7803-7902-0, doi: 10.1109/NLPKE.2003.1276019.

Siemens AG et al., "Technology of Ontology Clustering of Effective Reasoning Procedures", An IP.com Prior Art Database Technical Disclosure, Original Publication Date: Jun. 24, 2010, IP.com No. IPCOM000196642D, IP.com Electronic Publication: Jun. 10, 2010, Copyright: Siemens AG 2010, pp. 1-2, file: 2010J04346.doc.

Tang et al., "Improvements in Security Alert Analysis with a Truth Maintenance System", Proceedings of the 41st Hawaii International Conference on System Sciences—2008, 1530-1605/08, © 2008 IEEE, pp. 1-8.

"Methodology for Determining Similarity in Concepts using Ontology", An IP.com Prior Art Database Technical Disclosure, IP.com No. IPCOM000221083D, IP.com Electronic Publication: Aug. 28, 2012, pp. 1-4.

* cited by examiner

NATURAL LANGUAGE PROCESSING WITH DYNAMIC PIPELINES

FIELD OF THE INVENTION

The present disclosure relates generally to the field of natural language processing, and more particularly to natural language processing with dynamic pipelines.

BACKGROUND OF THE INVENTION

Natural language processing is a field of computer science, artificial intelligence, and linguistics concerned with the interactions between computers and human (natural) languages. As such, natural language processing is related to the area of human—computer interaction. Many challenges in natural language processing involve natural language understanding—that is, enabling computers to derive meaning from human or natural language input.

Unstructured Information Management Architecture (UIMA) is an open, industrial-strength, scalable and extensible platform that can be used to create analytic applications or search for programs that process text or other unstructured information to find the latent meaning, relationships, and relevant facts buried within. UIMA is a software architecture which specifies component interfaces, design patterns and development roles for creating, describing, discovering, composing, and deploying analysis capabilities for text, audio, video, or other unstructured information.

SUMMARY

A method, system, and computer program product for natural language processing is provided. A computer processor, selects a pipeline based on an artifact that includes unstructured data, the pipeline identifying a first algorithm of a first set of algorithms of a first human language technology (HLT) component and a second algorithm of a second set of algorithms of a second HLT component; applies the first algorithm based on the artifact to generate a first cluster space associated with the artifact; amends an evidence chain associated with the artifact in response to applying the first algorithm, wherein the evidence chain includes one or more probabilistic findings of truth corresponding to the artifact; standardizes a first ontology of the first cluster space; applies the second algorithm based on the artifact to generate a second cluster space that is associated with the artifact; and identifies a set of information of one or more corpora that is relevant to the artifact.

DETAILED DESCRIPTION

Embodiments of the present disclosure recognize that a natural language processing (NLP) system can automatically parse, tag, and extract knowledge from unstructured text. Further recognized is that an NLP system may be limited to identifying facts from unambiguous text. Further recognized is that an NLP system may be limited to determining relationships expressed explicitly.

Embodiments of the present disclosure provide an NLP system that identifies facts (e.g., business names, locations, dates) from ambiguous or vague text (e.g., natural language search queries). Further provided is an NLP system that determines relationships expressed indirectly, (e.g., relationships between entities within unstructured data). Further provided is an NLP system with dynamic analytic pipelines linking various human language technology (HLT) components. Further provided is that each HLT component can include a variety of algorithms. Further provided is an NLP system that mediates ontologies between HLT components and among resident and external corpora.

The present disclosure will now be described in detail with reference to the Figures.

Figure 1:
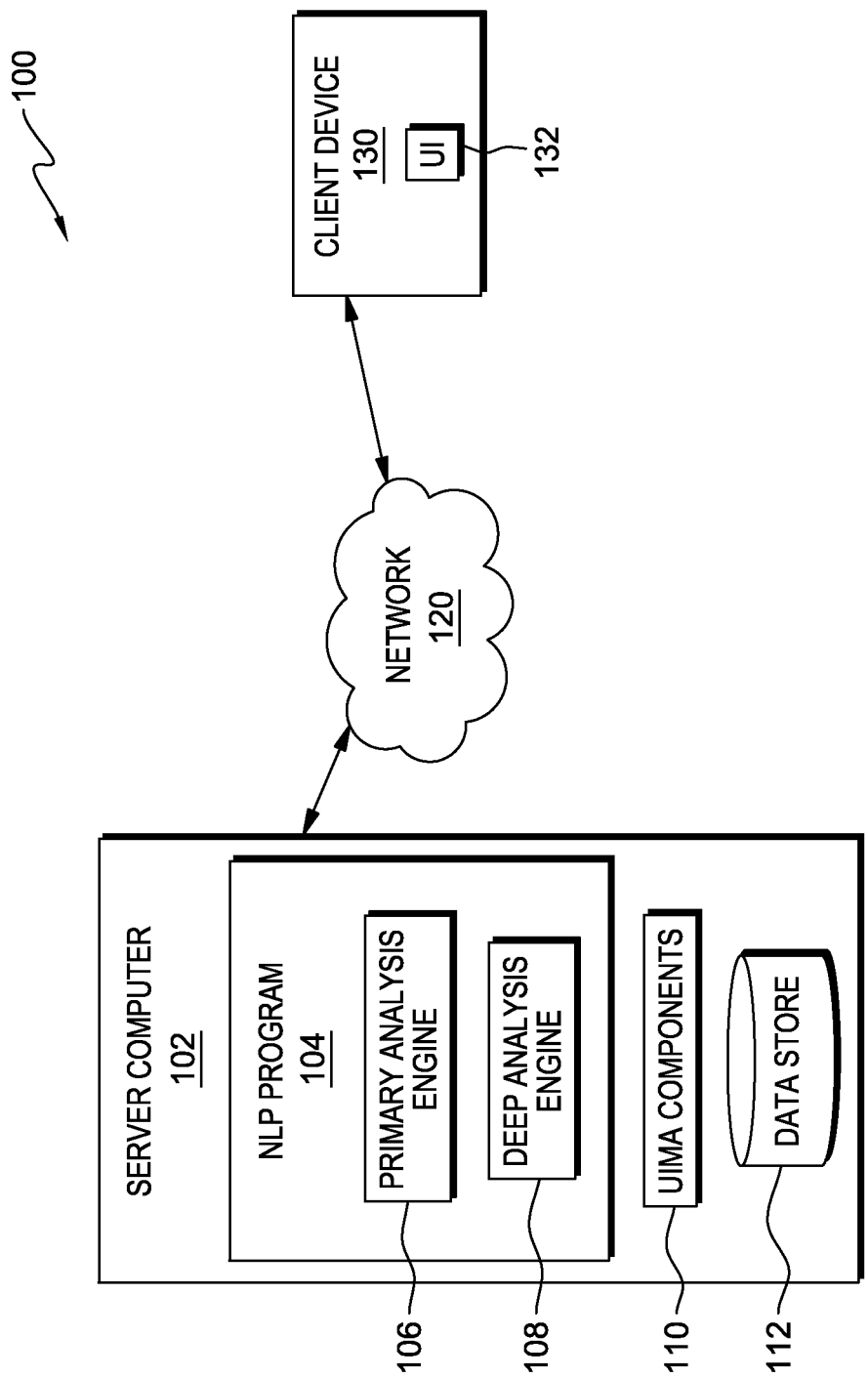
FIG. 1 is a functional block diagram illustrating a distributed data processing environment, in accordance with an embodiment of the present disclosure.

FIG. 1 is a functional block diagram illustrating a data processing environment, generally designated 100, in accordance with one embodiment of the present disclosure.

Data processing environment 100 includes server computer 102 and client device 130, both interconnected over network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server computer 102 and client device 130.

In various embodiments of the present disclosure, client device 130 can be a laptop computer, a tablet computer, a netbook computer, a personal computer (PC), a desktop computer, a personal digital assistant (PDA), a smart phone, or any programmable electronic device capable of communicating with server computer 102 via network 120. Client device 130 includes application user interface (UI) 132, which executes locally on client device 130 and has the capability to provide a user interface and receive user interactions. The user interactions can include a query, which client device 130 can send to server computer 102.

Server computer 102 may be a laptop computer, a tablet computer, a netbook computer, a personal computer (PC), a desktop computer, a personal digital assistant (PDA), a smart phone, or any programmable electronic device capable of communicating with client device 130 via network 120. In other embodiments, server computer 102 represents a computing system utilizing clustered computers and components to act as a single pool of seamless resources. In general, computing system 102 is representative of any programmable electronic device or combination of programmable electronic devices capable of accessing and/or executing UI 132, natural language processing (NLP)

program 104, primary analysis engine 106, deep analysis engine 108, UIMA components 110, data store 112, or any combination thereof, and capable of communicating with other computing devices (e.g., client device 130) via a network (e.g., network 120). Server computer 102 may include internal and external hardware components, as depicted and described in further detail with respect to FIG. 4. Server computer 102 includes NLP program 104, Unstructured Information Management Architecture (UIMA) components 110, and data store 112. NLP program 104 includes primary analysis engine 106 and deep analysis engine 108.

NLP program 104 operates to perform natural language processing. NLP program 104 includes primary analysis engine 106 and deep analysis engine 108. In one embodiment, primary analysis engine 106 and deep analysis engine 108 are each components or sub-routines of NLP program 104. In other embodiments, either or both of primary analysis engine 106 and deep analysis engine 108 may be programs independent from NLP program 104, provided that each of primary analysis engine 106 and deep analysis engine 108 can access one another, UIMA components 110, data store 112, and client device 130. In other embodiments, each of primary analysis engine 106 and deep analysis engine 108 are collective references to a group of sub-components, in which case any functionality attributed to either directly is instead performed by one or more of the sub-components of the respective group. In one embodiment, NLP program 104 resides on server computer 102. In other embodiments, NLP program 104 may reside on another server computer or another computing device, provided that NLP program 104 is accessible to and can access UIMA components 110, data store 112, and client device 130.

Primary analysis engine 106 operates to perform primary evidence retrieval. Primary evidence retrieval provides support for the formation of a conclusion or determination of a probabilistic finding. In one embodiment, primary evidence retrieval gathers evidence for the finding based on an artifact. Primary analysis engine 106 includes one or more human language technology (HLT) components, each of which includes one or more algorithms. A dynamic pipeline is a pipeline, which is a data structure that links a first HLT component to a second HLT component. A dynamic pipeline can identify one or more algorithms of each of the first and second HLT components. Each dynamic pipeline is associated with one or more cluster spaces, which are each a topological representation of unstructured data. Primary analysis engine 106 determines one or more algorithms for a dynamic pipeline. Each cluster space includes one or more clusters of data, each of which is a group of unstructured data that shares similarities with one another. Primary analysis engine 106 selects a dynamic pipeline that is populated with the determined one or more algorithms, or, alternatively, populates the dynamic pipeline with the determined one or more algorithms. Primary analysis engine 106 applies the algorithms of the dynamic pipeline to an artifact in order to generate a cluster space associated with the dynamic pipeline. Primary analysis engine 106 includes a mediating ontology, by which primary analysis engine 106 standardizes communications among algorithms to enable communication across disparate input and output formats. For example, a first algorithm may output a cluster space that represents data according to a first ontology, which may be an ontology that is incompatible for input to a second algorithm. Primary analysis engine 106 can standardize the output of the first algorithm to a mediating ontology to enable compatibility as input to the second algorithm, thereby enabling the application of both the first algorithm and the second algorithm to the same cluster space. Primary analysis engine 106 amends an evidence chain for truth maintenance. Primary analysis engine 106 is depicted and described in more detail, particularly with respect to FIG. 2 and FIG. 3.

Deep analysis engine 108 operates to perform deep evidence retrieval. Deep evidence retrieval provides support for the formation of a conclusion or determination of a probabilistic finding. In one embodiment, deep evidence retrieval gathers evidence for the finding based on one or more cluster spaces of an artifact and one or more corpora. Deep analysis engine 108 accesses one or more corpora, each of which (i.e., each corpus) is a body of data. Deep analysis engine 108 can mediate the ontologies of the one or more corpora. Deep analysis engine 108 determines a list (or, e.g., a set) of information from the corpora that is relevant to an artifact. Deep analysis engine 108 generates a summary report based, at least in part, on the list of information. Deep analysis engine 108 is depicted and discussed in more detail, particularly with respect to FIG. 2 and FIG. 4.

In some embodiments, each corpus is a body of data residing in a database. In one embodiment, a corpus resides in a database that resides in computer system 102. In various embodiments, one or more corpora reside on server computer 102 (e.g., within data store 112), on another server computer, on another computing device, or on any combination thereof, provided that NLP program 104 can access the corpora. In one example, the one or more corpora may include a data set from the linguistic data consortium. In another example, deep analysis engine 108 may generate one or more corpora based on at least one Common Analysis Structure (CAS), which is a data structure that can hold an artifact. A CAS can have multiple views, each with a representation of the artifact.

UIMA components 110 provide a UIMA framework and shared components that support the operations of NLP program 104. In one embodiment, UIMA components 110 reside on server computer 102. In other embodiments, UIMA components 110 may reside on another server computer or another computing device, provided that UIMA components 110 is accessible to and can access NLP program 104 and client device 130.

Data store 112 is a repository that may be written and read by NLP program 104 and UIMA components 110. In various embodiments, data may be stored to data store 112 including, for example, one or more corpora, summary reports, queries, artifacts, CASes, or dynamic pipelines. In some embodiments, data store 112 may be written and read by outside programs and entities to, e.g., populate the database with corpora. In one embodiment, data store 112 resides on server computer 102. In other embodiments, data store 112 may reside on another server, another computing device, or client device 130, provided that data store 112 is accessible to NLP program 104 and MIA components 110.

Figure 2:
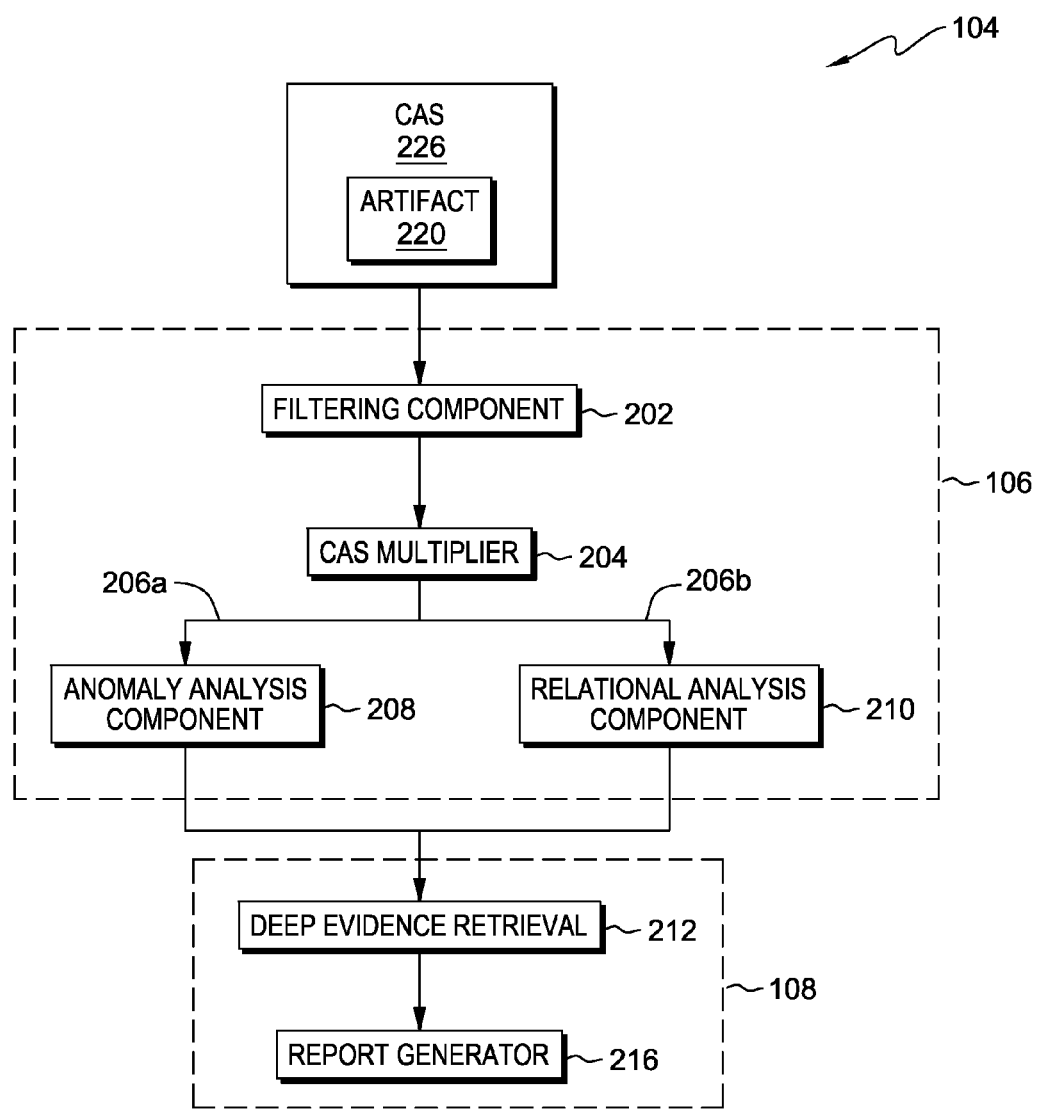
FIG. 2 is a flowchart depicting operational steps of a natural language processing program, on a server computer within the distributed data processing environment of FIG. 1, in accordance with an embodiment of the present disclosure.

FIG. 2 is a functional block diagram of NLP program 104. NLP program 104 includes CAS 226, which includes artifact 220. NLP program 104 further includes primary analysis engine 106, which includes filtering component 202, CAS multiplier 204, dynamic pipelines 206a and 206b (collectively referred to as dynamic pipelines 206), anomaly analysis component 208, and relational analysis component 210. NLP program 104 further includes deep analysis engine 108, which includes deep evidence retrieval 212 and report generator 216. In other embodiments, CAS 226 is independent of but accessible to NLP program 104. For example, CAS 226 may reside in data store 112 or in memory (e.g., RAM) of server computer 102, where CAS 226 is accessible to NLP program 104.

CAS 226 is a data structure generated by NLP program 104. CAS 226 includes artifact 220, which is the subject of analysis by NLP program 104. CAS 226 can include one or more views, each of which includes a representation of artifact 220. In various embodiments, artifact 220 includes text, audio, video, or any combination thereof. For example, artifact 220 may include a document containing unstructured text. Alternatively, artifact 220 may include an audio-video stream with subtitles, in which case artifact 220 includes text, audio, and video content. Artifact 220 is associated with an evidence chain. An evidence chain may be a data structure that includes one or more values representing probabilistic findings of truth. Such values may be determined by primary analysis engine 106 (e.g., based on a cluster space resulting from an algorithm of an HLT component), filtering component 202, anomaly analysis component 208, relational analysis component 210), deep analysis engine 108, deep evidence retrieval 212, or any combination thereof. A probabilistic finding of truth is a conclusion of a probability that an asserted finding is true or untrue. For example, an algorithm may assert an initial finding based on an algorithm, such as the initial finding that an artifact has a relevance that exceeds a pre-determined threshold with respect to a particular item of information. The algorithm may make a finding of probabilistic conclusion of truth by testing the asserted initial finding, which is included in the evidence chain for the artifact. In another embodiment, the evidence chain includes provenance information for each of one or more findings. Provenance information may identify the algorithm that generated the finding, the basis on which algorithm made the finding, a source of evidence, or any combination thereof. In one embodiment, artifact 220 can be associated with one or more dynamic pipelines (e.g., dynamic pipelines 206). A dynamic pipeline is a pipeline that can dynamically link one or more algorithms of each of a first and second HLT component. Each of dynamic pipelines 206 may be associated with CAS 226, artifact 220, or both.

Filtering component 202 operates to identify a knowledge domain. A knowledge domain is a field of interrelated information. Filtering component 202 may identify a knowledge domain based on artifact 220. For example, filtering component 202 may determine that unstructured data of artifact 220 contains the word "bears." Filtering component 202 may identify a knowledge domain for artifact 202 by determining that the unstructured data relates to animals, rather than, for example, an athletic team. NLP program 104 may reduce or eliminate from consideration of information outside of the knowledge domain identified by filtering component 202 by other analyses by NLP program 104 (e.g., by other HLT components), thereby reducing the risk of a falsely positive conclusion. Filtering component 202 may include one or more algorithms (i.e., a set of algorithms) that function to identify a knowledge domain based on unstructured data of artifact 202. One or more of such algorithms may be linked by a dynamic pipeline. Filtering component 202 applies one or more algorithms to CAS 226 in order to identify a knowledge domain. In other embodiments, primary analysis engine 106 applies filtering component 202 by applying one or more algorithms of filtering component 202. For example, primary analysis engine 106 applies filtering component 202 to CAS 226 by applying one or more algorithms of filtering component 202 to CAS 226 in order to identify a knowledge domain based on artifact 220. In some embodiments, filtering component 202 can include any algorithm that identifies a knowledge domain. In one such embodiment, filtering component 202 may add or remove algorithms based on user specifications. For example, filtering component 202 may include a set of algorithms that includes a first algorithm and a second algorithm, and may add a third algorithm to the set of algorithms in response to user specifications. In another embodiment, filtering component 202 may utilize machine learning to modify or refine one or more such algorithms. In one embodiment, filtering component 202 is an HLT component of primary analysis engine 106.

CAS multiplier 204 operates to generate views of CAS 226. A view is a unique representation of an artifact of a CAS resulting from the application of an operation, algorithm, or analysis engine to the artifact. For example, artifact 220 may be an audio file, in which case CAS multiplier 204 may generate a view of artifact 220 that includes a transcript by applying an analysis engine that determines the transcript of the audio file. In one embodiment, CAS multiplier 204 generates alternate views of CAS 226 in order to enable analysis of alternate representations of an artifact. In one example, CAS multiplier 204 generates alternate views of CAS 226 by applying one or more analysis engines of UIMA components 110. In one embodiment, CAS multiplier 204 is a component of primary analysis engine 106. In another embodiment, CAS multiplier 204 is a component of UIMA components 110 that is available to and executable by NLP program 106.

Anomaly analysis component 208 operates to identify novel unstructured data. In one embodiment, anomaly analysis component 280 includes one or more algorithms (i.e., a set of algorithms) that identify novel portions of unstructured data of the unstructured data of artifact 220. A portion of unstructured data may be novel if the portion does not conform to an expected pattern. In various examples, anomaly analysis component 208 may identify novel unstructured data based on unsupervised anomaly detection, supervised anomaly detection, or semi-supervised anomaly detection, based on statistical analysis to identify statistical outliers, based on cluster analysis to determine clusters formed by the portions of unstructured data, or based on any combination thereof. In one embodiment, anomaly analysis component 208 includes one or more algorithms that function to identify novel portions of unstructured data. For example, anomaly analysis component 208 applies one or more algorithms to CAS 226 in order to identify novel portions of unstructured data based on artifact 220. In other embodiments, primary analysis engine 106 applies anomaly analysis component 208 by applying one or more algorithms of anomaly analysis component 208. For example, primary analysis engine 106 applies an algorithm of anomaly analysis component 208 to artifact 220 to generate a cluster space associated with artifact 220 in order to identify novel portions of unstructured data. In some embodiments, anomaly analysis component 208 can include any algorithm that identifies novel portions of unstructured data. In one such embodiment, anomaly analysis component 208 may add or remove algorithms based on user specifications. For example, anomaly analysis component 208 may include a set of algorithms including a first algorithm and a second algorithm, and may add a third algorithm to the set of algorithm in response to user specifications. In another embodiment, anomaly analysis component 208 may utilize machine learning to modify or refine one or more such algorithms. In one embodiment, anomaly analysis component 208 is an HLT component of primary analysis engine 106.

Relational analysis component 210 operates to identify relationships of unstructured data. In one embodiment, relational analysis component 210 includes one or more algorithms (i.e., a set of algorithms) that identify relationships between and among portions of unstructured data of artifact 220. For example, for an artifact that includes the text "City Grill is a restaurant" in unstructured data, relational analysis component 210 may determine an associative relationship between "City Grill" and "restaurant." In another example, relational analysis component 210 may determine an employment relationship for an artifact that includes the text "John Doe is the head chef at City Grill" between "John Doe" and "City Grill." Relational analysis component 210 may apply one or more algorithms to CAS 226 in order to identify relationships of the unstructured data of artifact 220. In other embodiments, primary analysis engine 106 applies relational analysis component 210 by applying one or algorithms of relational analysis component 210. For example, primary analysis engine 106 applies an algorithm of relational analysis component 210 to CAS 226 that generates a cluster space associated with artifact 220 in order to identify relationships of unstructured data of artifact 220. In some embodiments, relational analysis component 210 can include any algorithm that identifies relationships of unstructured data. In one such embodiment, relational analysis component 210 may add or remove algorithms based on user specifications. For example, relational analysis component 210 may include a set of algorithms including a first algorithm and a second algorithm, and may add a third algorithm to the set of algorithm in response to user specifications. In another embodiment, relational analysis component 210 may utilize machine learning to modify or refine one or more such algorithms. In one embodiment, relational analysis component 210 is an HLT component of primary analysis engine 106.

Each of dynamic pipelines 206 represents one or more dynamic analytic pipelines. In one embodiment, each of dynamic pipelines 206 links a first HLT component and a second HLT component by identifying one or more algorithms of the first HLT component and one or more algorithms of the second HLT component. For example, a first dynamic pipeline identifies at least one algorithm of the one or more algorithms of a first HLT component, and also at least one algorithm of the one or more algorithms of a second HLT component. Each of dynamic pipelines 206 may identify algorithms based on a determination by primary analysis engine 106 (see step 310).

In some embodiments, each of dynamic pipelines 206 identifies an ordering of algorithms of HLT components. In one such embodiment, the order is an order in which the identified algorithms are to be applied. For example, a first dynamic pipeline identifies an order in which primary analysis engine 106 is to apply the one or more identified algorithms.

Each algorithm generates output (e.g., a cluster space) based on input (e.g., unstructured data of artifact 220). In one embodiment, the input and output ontologies of each algorithm varies with respect to other algorithms. For example, the output generated by a first algorithm may follow an ontology that is different from the ontology followed by an input of a second algorithm. In one embodiment, dynamic pipelines 206 include ontology mediation functionality to standardize the input ontology and output ontology of each algorithm. Dynamic pipelines 206 may utilize ontology mediation to map the ontology of one algorithm to another algorithm, thereby enabling compatibility between the algorithms that follow disparate ontologies. For example, the word "chef" may be characterized as an "Employment Position" by an ontology of a first algorithm and as a "Job Title" by an ontology of a second algorithm, in which case dynamic pipelines 206 may utilize ontology mediation to map "Employment Position" to "Job Title" in order to enable compatibility between the first and second algorithms. In one embodiment, dynamic pipelines 206 maps ontologies based on pre-determined equivalencies between fields of various ontologies. In another embodiment, dynamic pipelines 206 maps ontologies by performing unsupervised clustering based on the ontologies in order to identify fields to merge and fields that have no equivalency between the ontologies. Alternatively, dynamic pipelines 206 may utilize ontology mediation to map the ontology of each algorithm to a common representation, such as a resource description framework (RDF) representation.

Deep evidence retrieval 212 operates to identify relevant information from one or more corpora. In one embodiment, deep evidence retrieval 212 identifies relevant information from one or more corpora based on, at least in part, artifact 220, CAS 226 (including the one or more cluster spaces associated therewith), and the one or more corpora. For example, deep evidence retrieval 212 analyzes CAS 226 and one or more corpora in order to identify a list (or, e.g., a set) of information of the one or more corpora related to CAS 226. In one embodiment, deep evidence retrieval 212 is a component of deep analysis engine 108.

Report generator 216 operates to generate a summary report. In one embodiment, report generator 216 generates a summary report based on, at least in part, a list of relevant information. For example, report generator 216 generates a summary report based on a list of relevant information, which is generated by deep evidence retrieval 212, and an evidence chain, which is associated with artifact 220. In one embodiment, report generator 216 is a component of deep analysis engine 108.

FIG. 2 is discussed in more detail in connection with the discussions accompanying FIG. 3 and FIG. 4.

Figure 3:
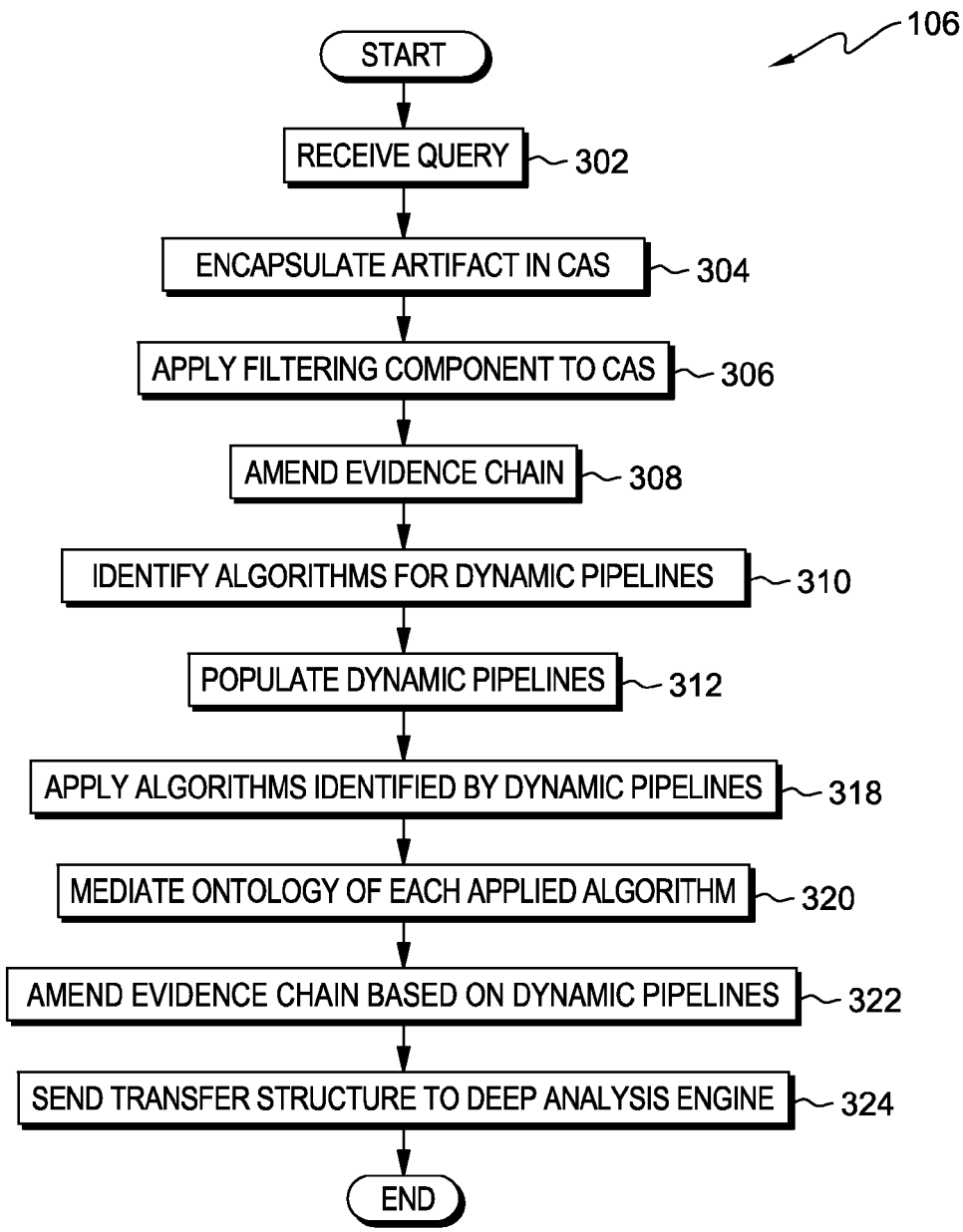
FIG. 3 is a flowchart depicting operational steps of a primary analysis engine of the natural language processing program, in accordance with an embodiment of the present disclosure.

FIG. 3 is a flowchart depicting the operational steps of primary analysis engine 106 of NLP program 104.

In step 302, primary analysis engine 106 receives artifact 220. In one embodiment, primary analysis engine 106 receives a query from client device 130 that identifies artifact 220.

In step 304, primary analysis engine 106 encapsulates artifact 220 in CAS 226. Primary analysis engine 106 may encapsulate artifact 220 in CAS 226 by generating CAS 226 based on artifact 220. In one embodiment, CAS 226 and each HLT component utilize a consistent ontology. In some embodiments, the input and output ontologies of CAS 226 is consistent with an input and output ontologies of UIMA. In one such embodiment, UIMA components 110 include an implementation of UIMA, thereby enabling primary analysis engine 106 to utilize any of various analysis engines or other capabilities of UIMA components 110 in combination with CAS 226.

In step 306, primary analysis engine 106 applies filtering component 202 to CAS 226. In one embodiment, primary analysis engine 106 applies one or more algorithms of filtering component 202 to CAS 226 in order to identify a knowledge domain. In one embodiment, primary analysis engine 106 associates the identified knowledge domain with artifact 220. For example, one or more algorithms of filtering component 202 identify a knowledge domain by comparing unstructured data of artifact 220 to data from one or more knowledge domains to determine a knowledge domain to which the unstructured data belongs. In various embodiments, primary analysis engine 106 applies one or more algorithms of filtering component 202 that are identified by, for example, dynamic pipelines 206, CAS 226, primary analysis engine 106, or user specifications.

In some embodiments, primary analysis engine 106 applies CAS multiplier 204 in order to generate additional views of CAS 226. In one such embodiment, CAS multiplier 204 generates additional views of CAS 206 by generating one or more alternative representations of artifact 220. In various embodiments, CAS multiplier 204 generates additional views by applying one or more annotators or analysis engines of UIMA components 110. Primary analysis engine 106 may store additional views resulting from CAS multiplier 204 to CAS 226. Alternatively, primary analysis engine 106 may store additional views resulting from CAS multiplier 204 to data store 112, and may associate the additional views with CAS 226.

In step 308, primary analysis engine 106 amends an evidence chain based on each filtering algorithm applied. In one embodiment, primary analysis engine 106 amends the evidence chain associated with artifact 220 by adding a probabilistic finding of truth generated by each applied filtering algorithm to the evidence chain. In another embodiment, primary analysis engine 106 amends the evidence chain to reflect providence information corresponding to each such algorithm applied.

In step 310, primary analysis engine 106 identifies algorithms for dynamic pipelines 206. Identifying algorithms for dynamic pipelines 206 may include determining an ordering of a plurality of algorithms. In one embodiment, primary analysis engine 106 identifies algorithms for each of dynamic pipelines 206 based on a cluster space associated with artifact 220. The cluster space may be an initial cluster space generated by primary analysis engine 106 based on artifact 220 (or, e.g., based on unstructured data of artifact 220). Alternatively, the cluster space may be a cluster space generated by an algorithm of an HLT component based on artifact 220 (or, e.g., based on unstructured data of artifact 220). Primary analysis engine 106 may identify algorithms based on the cluster space by applying semi-supervised machine learning. The machine learning may, for example, evaluate the cluster space associated with artifact 220 based on a statistical F-score, cluster quality, search efficiency, search quality, a rand index, or a combination thereof, and may identify algorithms based on the evaluation of the cluster space.

In some embodiments, primary analysis engine 106 identifies algorithms for dynamic pipelines 206 based on user specifications. Primary analysis engine 106 may receive the user specifications from, e.g., client device 130. For example, the user specifications may include a list specifying one or more algorithms and an ordering of the algorithms for one or more of dynamic pipelines 206, in which case primary analysis engine 106 identifies the algorithms and ordering specified by the user specifications.

In some embodiments, primary analysis engine 106 identifies algorithms for one or more dynamic pipelines for each view of CAS 226. Each dynamic pipeline for each view of CAS 226 may link the same algorithms, or may link different algorithms relative to one another. Primary analysis engine 106 may identify algorithms for more than one dynamic pipeline, including identifying every possible combination and permutation of the one or more algorithms of a first HLT component and a second HLT component. Alternatively, primary analysis engine 106 may identify less than all of such possible combinations and permutations. For example, primary analysis engine 106 may determine one or more algorithms based on semi-supervised machine learning, as previously discussed.

In step 312, primary analysis engine 106 populates dynamic pipelines. In one embodiment, primary analysis engine 106 populates dynamic pipelines of dynamic pipelines 206 based on the identified algorithms (see step 310). For example, primary analysis engine 106 populates dynamic pipelines of dynamic pipelines 206 in order to link the identified algorithms. The number of dynamic pipelines that primary analysis engine 106 populates may depend upon the number of dynamic pipelines for which primary analysis engine 106 identified algorithms (see step 310).

In step 318, primary analysis engine 106 applies each algorithm identified by each of dynamic pipelines 206. In one embodiment, primary analysis engine 106 applies each identified algorithm to the one or more cluster spaces associated with artifact 220. For example, primary analysis engine 106 modifies a cluster space based on the results of each algorithm applied. Alternatively, each algorithm generates a cluster space that is associated with artifact 220. In one embodiment, each of dynamic pipelines 206 identifies an order in which to apply one or more algorithms. In such embodiment, primary analysis engine 106 applies each of the one or more algorithms in sequence, according to the identified order. Alternatively, primary analysis engine 106 may apply each algorithm in parallel. In various embodiments, each of dynamic pipelines 206 identifies one or more algorithms of anomaly analysis component 208, one or more algorithms of relational analysis component 210, or any combination thereof.

In some embodiments, primary analysis engine 106 applies algorithms of anomaly analysis component 208 and algorithms of relational analysis component 210 in parallel. For example, both anomaly analysis component 208 and relational analysis component 210 may share simultaneous access to the one or more cluster spaces associated with artifact 220, thereby allowing primary analysis engine 106 to execute an algorithm of each component in parallel.

In step 320, primary analysis engine 106 mediates the ontology of each applied algorithm. Primary analysis engine 106 may mediate the ontology of each applied algorithm by modifying each cluster space associated with CAS 226 resulting from an applied algorithm (see step 318). In one embodiment, primary analysis engine 106 mediates the ontology of each such algorithm of anomaly analysis component 208 and relational analysis component 210 applied to CAS 226. For example, dynamic pipelines 206 of primary analysis engine 106 mediate the ontology of each such applied algorithm of anomaly analysis component 208 and relational analysis component 210. In one embodiment, the ontology of each such applied algorithm is mediated by standardizing the ontology to RDF representation. In another embodiment, the ontology of each such applied algorithm is mediated by standardizing the ontology to the ontology of the algorithm that is next in order, as identified by a dynamic pipeline of dynamic pipelines 206.

In step 322, primary analysis engine 106 amends the evidence chain associated with artifact 220 based on each dynamic pipeline. Primary analysis engine 106 may amend the evidence chain based on each cluster space resulting from the application of each algorithm identified by each dynamic pipeline associated with artifact 220. In one embodiment, primary analysis engine 106 amends the evidence chain to reflect probabilistic findings of truth of each such algorithm applied. In another embodiment, primary analysis engine 106 amends the evidence chain to reflect providence information corresponding to each such algorithm applied.

In step 324, primary analysis engine 106 sends CAS 226 to deep analysis engine 108.

Figure 4:
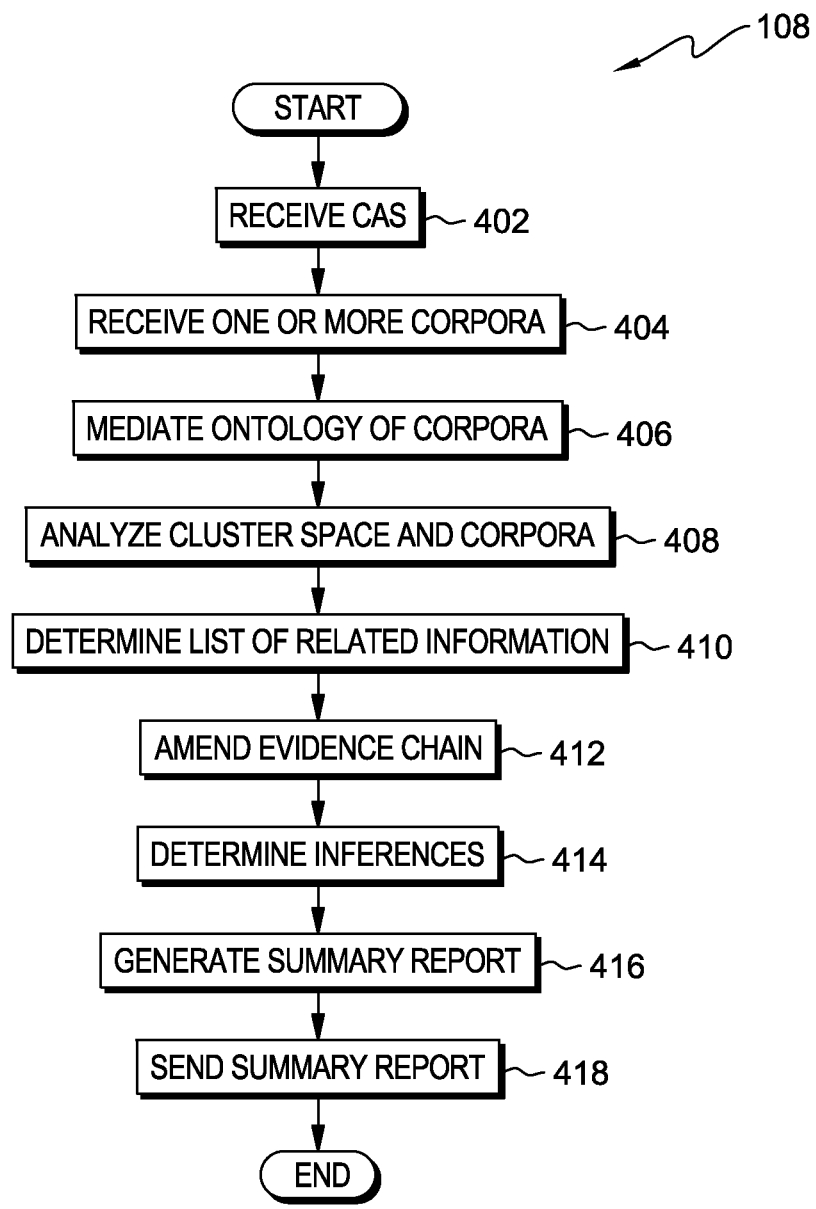
FIG. 4 is a flowchart depicting operational steps of a deep analysis engine of the natural language processing program, in accordance with an embodiment of the present disclosure.

FIG. 4 is a flowchart depicting the operational steps of deep analysis engine 108 of NLP program 104.

In step 402, deep analysis engine 108 receives a Common Analysis Structure (CAS). In one embodiment, deep evidence retrieval 212 of deep analysis engine 108 receives CAS 226 from primary analysis engine 106. In another embodiment, deep evidence retrieval 212 receives CAS 226 by retrieving CAS 226. For example, deep evidence retrieval 212 receives a reference to CAS 226 and accesses storage (or, e.g., memory). Responsive to the reference, deep evidence retrieval 212 retrieves CAS 226. In one embodiment, CAS 226 includes artifact 220, which is associated with an evidence chain. In another embodiment, CAS 226 includes artifact 220, which is associated with one or more cluster spaces generated by primary analysis engine 106 (e.g., resulting from the application of an algorithm of an HLT component of primary analysis engine 106). For example, the one or more cluster spaces associated with artifact 220 are modified by the results of one or more algorithms of anomaly analysis component 208 and the results of one or more algorithms of relational analysis component 210.

In step 404, deep analysis engine 108 receives one or more corpora. In one embodiment, deep evidence retrieval 212 of deep analysis engine 108 receives one or more corpora of data store 112. For example, deep evidence retrieval 212 receives one or more corpora by accessing (or, e.g., retrieving) one or more corpora of data store 112.

In step 406, deep analysis engine 108 mediates the ontology of the corpora. In one embodiment, deep analysis engine 108 mediates the ontology of each of the one or more received corpora. For example, deep evidence retrieval 212 of deep analysis engine 108 mediates the ontology of each of the one or more corpora. In one embodiment, the ontology of each received corpora is mediated by standardizing the ontology to RDF representation.

In step 408, deep analysis engine 108 analyzes one or more cluster spaces and one or more corpora. In one embodiment, deep evidence retrieval 212 of deep analysis engine 108 analyzes the one or more cluster spaces associated with artifact 220 and the received corpora. In some embodiments, deep evidence retrieval 212 analyzes the one or more cluster spaces and corpora in order to identify information of the corpora with a degree of relevance to the one or more cluster spaces of artifact 220 that exceeds a pre-determined threshold. In various embodiments, deep evidence retrieval 212 applies one or more deep evidence algorithms, search engines, other linguistic tools, or any combination thereof in order to analyze the one or more cluster spaces and corpora. In various examples, deep evidence retrieval 212 may analyze the one or more cluster spaces and corpora based on a variety of algorithms, including natural language search engines, word-sense disambiguation systems, lexical answer type coercion systems, or any combination thereof.

In some embodiments, deep evidence retrieval 212 can include one or more algorithms that each function to analyze the one or more cluster spaces and corpora to identify relevant information. In one such embodiment, deep evidence retrieval 212 may add or remove algorithms in response to user specifications. In another embodiment, deep evidence retrieval 212 may utilize machine learning to modify or refine one or more such algorithms.

In step 410, deep analysis engine 108 determines a list of related information. The list of related information includes information of one or more corpora identified by deep analysis engine 108 as related to CAS 226 (see step 408). For example, the information may be related to CAS 226 based on the one or more cluster spaces associated with artifact 220. An inference may be a conclusion or determination of a probabilistic finding based on a plurality of other conclusions or determination of probabilistic findings.

In some embodiments, deep evidence retrieval 212 determines a confidence score for each information item identified by the list of relevant information. The confidence score may represent a degree of certainty that the information item has a relevance that exceeds a pre-determined threshold with respect to artifact 220. Deep analysis engine 108 may determine the confidence score using probability density functions. Alternatively, deep analysis engine 108 determines the confidence score utilizing statistical and analytical techniques including logistics regression, decision trees, clustering, neural networks, or any combination thereof. In another embodiment, deep evidence retrieval 212 also compares the information item to the one or more cluster spaces associated with artifact 220, information of one or more corpora, or any combination thereof. In another such embodiment, deep evidence retrieval 212 utilizes one or more machine experts in order to determine a confidence score for each information item. For example, deep evidence retrieval 212 may generate a confidence score utilizing a machine expert that comprises an inference engine and a knowledge base.

In some embodiments, deep evidence retrieval 212 determines a list of related information based on a machine learning sub-system that includes machine-generated models. In one such embodiment, deep analysis engine 108 refines the machine-generated models using a joint inference model that utilizes client specifications from client device 130 and unclassified training materials.

In step 412, deep analysis engine 108 amends an evidence chain. In one embodiment, deep evidence retrieval 212 of deep analysis engine 108 amends the evidence chain associated with artifact 220 by adding to the evidence chain a probabilistic finding of truth generated by each filtering algorithm applied. For example, deep evidence retrieval 212 may amend the evidence chain based on the results of the one or more deep evidence algorithms applied by deep analysis engine 108. In various embodiments, the evidence chain includes probabilistic findings of truth, provenance information, or a combination thereof, which, in one such example, correspond to information items of one or more corpora.

In step 414, deep analysis engine 108 determines inferences. In one embodiment, the determined inferences identify one or more information items from the received corpora that are related to artifact 220. For example, the determined inferences may be determinations of the existence of a relationship (e.g., a semantic relationship) between artifact 220 and an information item identified by the list of related information. Deep analysis engine 108 may determine the inferences based on a confidence score for each information item. Alternatively, deep evidence retrieval 212 of deep analysis engine 108 determines inferences based on artifact 220, the evidence chain associated with artifact 220, the one or more cluster spaces associated with artifact 220, the one or more corpora, or any combination thereof. In another embodiment, deep evidence retrieval 212 modifies the list of related information based on the one or more determined inferences. For example, deep evidence retrieval 212 may modify the list or related information to identify some or all of the determined inferences.

In step 416, deep analysis engine 108 generates a summary report. In one embodiment, report generator 216 of deep analysis engine 108 generates a summary report based on the determined inferences. In one embodiment, the summary report includes a list of information of the one or more corpora that is related to artifact 220. For example, the list of information may include one or more information items ranked in order of the confidence score for each information item. In another embodiment, report generator 216 generates a summary report based on the one or more cluster spaces associated with artifact 220. For example, the summary report may identify one or more clusters associated with artifact 220. In some embodiments, the summary report includes a confidence score for each information item. In some embodiments, the summary report includes truth maintenance information for each information item. In one such embodiment, deep analysis engine 108 generates the truth maintenance information based on the evidence chain associated with artifact 220. In various embodiments, the truth maintenance information corresponding to an information item includes probabilistic findings of truth, provenance information, or a combination thereof.

In step 418, deep analysis engine 108 sends the summary report. In one embodiment, report generator 216 of deep analysis engine 108 sends the summary report to, for example, client device 130. In another embodiment, report generator 216 sends a notification corresponding to the summary report to client device 130. In yet another embodiment, report generator 216 sends the summary report to a database. For example, report generator 216 may store the summary report to a database (e.g., data store 112).

Figure 5:
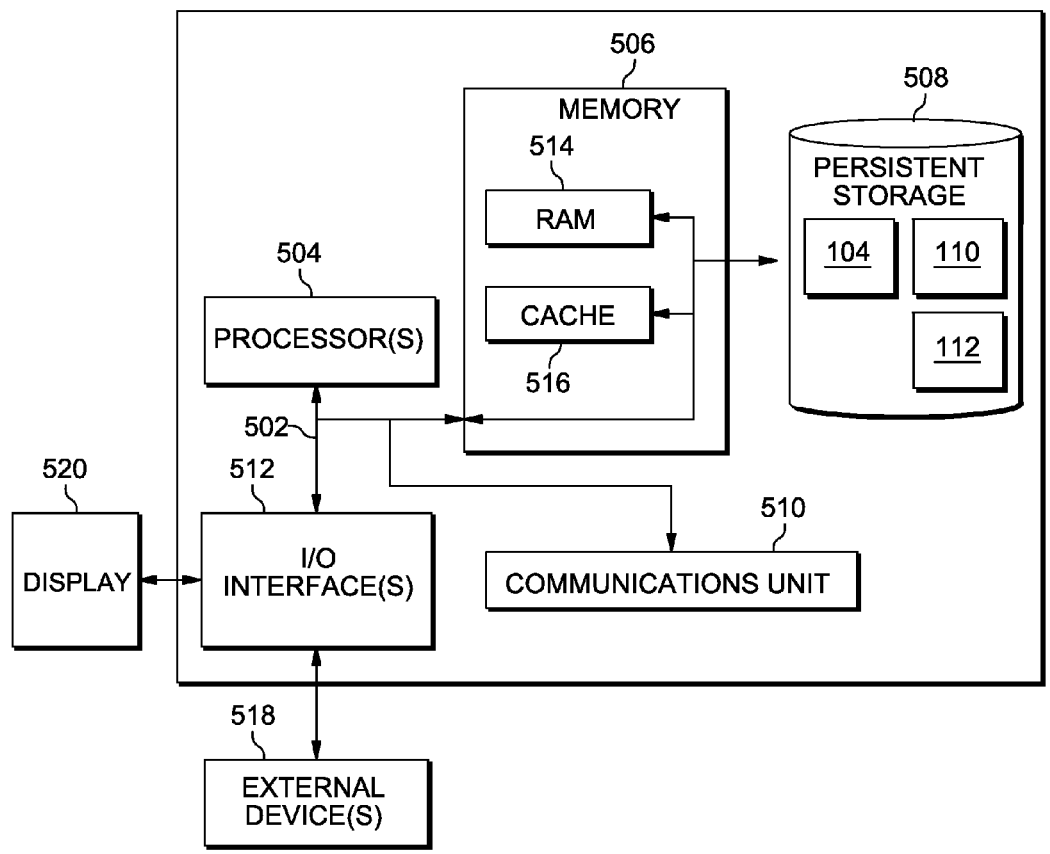
FIG. 5 is a block diagram of components of the server computer executing the natural language processing program, in accordance with an embodiment of the present disclosure.

FIG. 5 depicts a block diagram of respective components of server computer 102 and client device 130 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Server computer 102 and client device 130, respectively, includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

NLP program 104, UIMA components 110, and data store 112 are stored in persistent storage 508 for execution and/or access by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of client device 130 and server computer 102, respectively. In these examples, communications unit 510 includes one or more network interface cards. Communications unit 510 may provide communications through the use of either or both physical and wireless communications links. NLP program 104, UIMA components 110, and data store 112 may be downloaded to persistent storage 508 through communications unit 510.

I/O interface(s) 512 allows for input and output of data with other devices that may be connected to server computer 102 and client device 130, respectively. For example, I/O interface(s) 512 may provide a connection to external devices 518 such as a keyboard, a keypad, a touch screen, and/or some other suitable input device. External devices 518 can also include portable computer-readable storage media such as, for example, thumb drives, portable optical or magnetic disks, and memory cards. Software and data used to practice embodiments of the present disclosure, e.g., NLP program 104, UIMA components 110, and data store 112, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for natural language processing, the method comprising:

selecting, by a computer processor, a dynamic pipeline based, at least in part, on a corpus, wherein the dynamic pipeline links a first human language technology component and a second human language technology component, wherein the first human language technology component comprises a first set of algorithms and the second human language technology component comprises a second set of algorithms and wherein the corpus includes at least text, audio, and video;

identifying, by a computer processor, a first algorithm of the first set of algorithms associated with the first human language technology component and a second algorithm of the second set of algorithms associated with the second human language technology component;

applying, by the computer processor, the first algorithm based, at least in part, on the corpus to generate a first cluster space that reflects a dynamic determination of relationships within the corpus, wherein the first cluster space includes probabilities that each respective relationship within the corpus is true or untrue;

amending, by the computer processor, an evidence chain that includes one or more findings of true relationships associated with the corpus in response to applying the first algorithm, to reflect a most recent finding of a true relationship of the true relationships that supersedes a previous finding in light of a probabilistic determination from new determined relationships in the first cluster space;

standardizing, by the computer processor, a first ontology of the first cluster space, wherein the first ontology is a data structure on a computer;

applying, by the computer processor, the second algorithm based, at least in part, on the corpus and the first ontology of the first cluster space to generate a second cluster space that is associated with the corpus;

identifying, by the computer processor, a set of information of one or more corpora that has a relevance to the corpus that exceeds a pre-determined threshold based, at least in part, on the first and second cluster spaces of corpus; and generating, by the computer processor, a summary report based, at least in part, on the set of information of the one or more corpora.

2. The method of claim 1, wherein standardizing the first ontology of the first cluster space comprises:

determining, by the computer processor, the first ontology of the first cluster space of the first algorithm; and standardizing, by the computer processor, the first ontology to a resource description framework representation.

3. The method of claim 1, wherein standardizing the first ontology of the first cluster space comprises:

determining, by the computer processor, the first ontology of the first cluster space of the first algorithm;

determining, by the computer processor, a second ontology of the second cluster space of the second algorithm; and standardizing, by the computer processor, the first ontology to the second ontology.

4. The method of claim 1, further comprising:

modifying, by the computer processor, the first set of algorithms of the first human language technology component based, at least in part, on a user specification that specifies a third algorithm, by adding the third algorithm to the first set of algorithms.

5. The method of claim 1, wherein identifying the set of information further includes:

standardizing, by the computer processor, an ontology of each of the one or more corpora;

comparing, by the computer processor, the cluster space of the corpus to each of the one or more corpora;

determining, by the computer processor, a relevance to the corpus of a first information item of the set of information; and determining, by the computer processor, an inference representing a relationship corresponding to the corpus, wherein the inference is based, at least in part, on the first information item of the set of information.

6. The method of claim 1, wherein the pipeline includes an order of algorithms that identifies an order in which to apply a plurality of algorithms.

7. The method of claim 1, wherein the summary report is based, at least in part, on the evidence chain associated with the corpus and the cluster space of the corpus.

8. A computer program product for natural language processing, the computer program product comprising a computer readable storage medium having one or more computer readable storage media and program instructions stored on the one or more computer readable storage media, the program instructions comprising:

program instructions to select a dynamic pipeline based, at least in part, on a corpus, wherein the dynamic pipeline links a first human language technology component and a second human language technology component, wherein the first human language technology component comprises a first set of algorithms and the second human language technology component comprises a second set of algorithms and wherein the corpus includes at least text, audio, and video;

program instructions to identify a first algorithm of the first set of algorithms associated with the first human language technology component and a second algorithm of the second set of algorithms associated with the second human language technology component;

program instructions to apply, the first algorithm based, at least in part, on the corpus to generate a first cluster space that reflects a dynamic determination of relationships within the corpus, wherein the first cluster space includes probabilities that each respective relationship within the corpus is true or untrue;

program instructions to standardize, a first ontology of the first cluster space, wherein the first ontology is a data structure on a computer;

program instructions to amend an evidence chain that includes one or more findings of true relationships associated with the corpus in response to applying the first algorithm, to reflect a most recent finding of a true relationship of the true relationships that supersedes a previous finding in light of a probabilistic determination from new determined relationships in the first cluster space;

program instructions to standardize a first ontology of the first cluster space;

program instructions to apply the second algorithm based, at least in part, on the corpus and the first ontology of the first cluster space to generate a second cluster space that is associated with the corpus;

program instructions to identify a set of information of one or more corpora that has a relevance to the corpus that exceeds a pre-determined threshold based, at least in part, on the first and second cluster spaces of the corpus; and program instructions to generate a summary report based, at least in part, on the set of information of the one or more corpora.

9. The computer program product of claim 8, wherein the program instructions to standardize the first ontology of the first cluster space comprise:

program instructions to determine the first ontology of the first cluster space of the first algorithm; and program instructions to standardize the first ontology to a resource description framework representation.

10. The computer program product of claim 8, wherein the program instructions to standardize the first ontology of the first cluster space comprise:

program instructions to determine the first ontology of the first cluster space of the first algorithm;

program instructions to determine a second ontology of the second cluster space of the second algorithm; and program instructions to standardize the first ontology to the second ontology.

11. The computer program product of claim 8, wherein the program instructions stored on the one or more computer readable storage media further comprise:

program instructions to modify the first set of algorithms of the first human language technology component based, at least in part, on a user specification that specifies a third algorithm, by adding the third algorithm to the first set of algorithms.

12. The computer program product of claim 8, wherein the program instructions to identify the set of information of the one or more corpora further includes:
   program instructions to standardize an ontology of each of the one or more corpora;
   program instructions to compare the cluster space of the corpus to each of the one or more corpora;
   program instructions to determine a relevance to the corpus of a first information item of the set of information; and
   program instructions to determine an inference representing a relationship corresponding to the corpus, wherein the inference is based, at least in part, on the first information item of the set of information.

13. The computer program product of claim 8, wherein the pipeline includes an order of algorithms that identifies an order in which to apply a plurality of algorithms.

14. A computer system for natural language processing, the computer system comprising:
   a memory; and
   a processor in communication with the memory, wherein the computer system is configured to perform a method, said method comprising:
   selecting, by a computer processor, a dynamic pipeline based, at least in part, on a, wherein the dynamic pipeline links a first human language technology component and a second human language technology component, wherein the first human language technology component comprises a first set of algorithms and the second human language technology component comprises a second set of algorithms and wherein the corpus includes at least text, audio, and video;
   identifying, a first algorithm of the first set of algorithms associated with the first human language technology component and a second algorithm of the second set of algorithms associated with the second human language technology component;
   applying, by the computer processor, the first algorithm based, at least in part, on the corpus to generate a first cluster space that reflects a dynamic determination of relationships within the corpus, wherein the first cluster space includes probabilities that each respective relationship within the corpus is true or untrue;
   amending, by the computer processor, an evidence chain that includes one or more findings of true relationships associated with the corpus in response to applying the first algorithm, to reflect a most recent finding of a true relationship of the true relationships that supersedes a previous finding in light of a probabilistic determination from new determined relationships in the first cluster space;
   standardizing, by the computer processor, a first ontology of the first cluster space, wherein the first ontology is a data structure on a computer;
   applying, by the computer processor, the second algorithm based, at least in part, on the corpus and the first ontology of the first cluster space to generate a second cluster space that is associated with the corpus;
   identifying, by the computer processor, a set of information of one or more corpora that has a relevance to the corpus that exceeds a pre-determined threshold based, at least in part, on the first and second cluster spaces of the corpus; and
   generating, by the computer processor, a summary report based, at least in part, on the set of information of the one or more corpora.

15. The computer system of claim 14, wherein standardizing the first ontology of the first cluster space comprises:
   determining, by the computer processor, the first ontology of the first cluster space of the first algorithm; and
   standardizing, by the computer processor, the first ontology to a resource description framework representation.

16. The computer system of claim 14, wherein standardizing the first ontology of the first cluster space comprises:
   determining, by the computer processor, the first ontology of the first cluster space of the first algorithm;
   determining, by the computer processor, a second ontology of the second cluster space of the second algorithm; and
   standardizing, by the computer processor, the first ontology to the second ontology.

17. The computer system of claim 14, wherein the method further comprises:
   modifying, by the computer processor, the first set of algorithms of the first human language technology component based, at least in part, on a user specification that specifies a third algorithm, by adding the third algorithm to the first set of algorithms.

18. The computer system of claim 14, wherein identifying the set of information of the one or more corpora further includes:
   standardizing, by the computer processor, an ontology of each of the one or more corpora;
   comparing, by the computer processor, the cluster space of the corpus to each of the one or more corpora;
   determining, by the computer processor, a relevance to the corpus of a first information item of the set of information; and
   determining, by the computer processor, an inference representing a relationship corresponding to the corpus, wherein the inference is based, at least in part, on the first information item of the set of information.

19. The computer system of claim 14, wherein the pipeline includes an order of algorithms that identifies an order in which to apply a plurality of algorithms.

20. The computer system of claim 14, wherein the summary report is based at least in part, on the evidence chain associated with the corpus and the cluster space of the corpus.

* * * * *